United States Patent
Sirianni et al.

(10) Patent No.: US 11,714,884 B1
(45) Date of Patent: *Aug. 1, 2023

(54) SYSTEMS AND METHODS FOR ESTABLISHING AND MANAGING COMPUTER NETWORK ACCESS PRIVILEGES

(71) Applicant: Architecture Technology Corporation, Minneapolis, MN (US)

(72) Inventors: Joseph Sirianni, Ithaca, NY (US); Matthew Donovan, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,159

(22) Filed: Jun. 6, 2022

Related U.S. Application Data

(63) Continuation of application No. 16/839,728, filed on Apr. 3, 2020, now Pat. No. 11,354,386, which is a continuation of application No. 15/701,128, filed on Sep. 11, 2017, now Pat. No. 10,628,560.

(51) Int. Cl.
| | |
|---|---|
| *G06F 21/12* | (2013.01) |
| *H04L 9/40* | (2022.01) |
| *G06F 21/60* | (2013.01) |
| *H04W 12/08* | (2021.01) |

(52) U.S. Cl.
CPC .......... *G06F 21/123* (2013.01); *G06F 21/604* (2013.01); *H04L 63/101* (2013.01); *H04W 12/08* (2013.01)

(58) Field of Classification Search
CPC ... G06F 21/123; G06F 21/604; H04L 63/101; H04W 12/08
See application file for complete search history.

(56) References Cited

U.S. PATENT DOCUMENTS

| | | | |
|---|---|---|---|
| 2009/0287653 A1* | 11/2009 | Bennett | G06F 16/951 |
| 2009/0319835 A1* | 12/2009 | Teranishi | G06F 11/3423 714/45 |
| 2011/0010754 A1* | 1/2011 | Morita | G06F 21/604 726/1 |
| 2013/0145472 A1* | 6/2013 | Ramabhatta | H04L 63/145 726/25 |
| 2013/0232540 A1* | 9/2013 | Saidi | H04L 63/10 726/1 |

(Continued)

*Primary Examiner* — Mohammed Waliullah
(74) *Attorney, Agent, or Firm* — Key IP Law Group, PLLC

(57) ABSTRACT

A method for detecting, identifying, and mitigating advanced persistent threats in a computer network having one or more computers includes a processor in the computer network: receiving a request to access a resource in the computer network; identifying the request as originating from an application executing on the computer network; executing an anomaly operation to determine a behavior of the application is one of anomalous and not anomalous; executing a privilege operation to determine the request is one of permanently allowed and not-permanently allowed; granting access to the resource for both a non-anomalous-behaving application and a permanently allowed request; and generating and displaying, on a graphical user interface of the computer network, and prompt for either an anomalous-behaving application or a not-permanently allowed request.

20 Claims, 9 Drawing Sheets

(56) References Cited

U.S. PATENT DOCUMENTS

2015/0332043 A1\* 11/2015 Russello ................. G06F 11/30
　　　　　　　　　　　　　　　　　　　　726/23
2018/0069881 A1\* 3/2018 Graves ................. H04L 43/028

\* cited by examiner

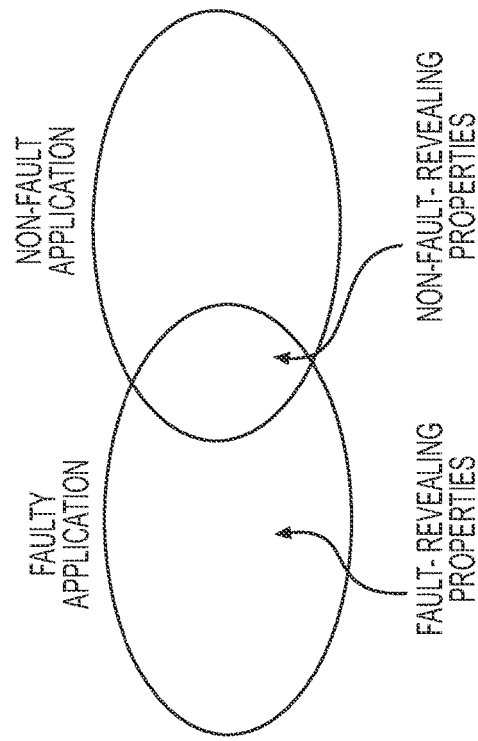
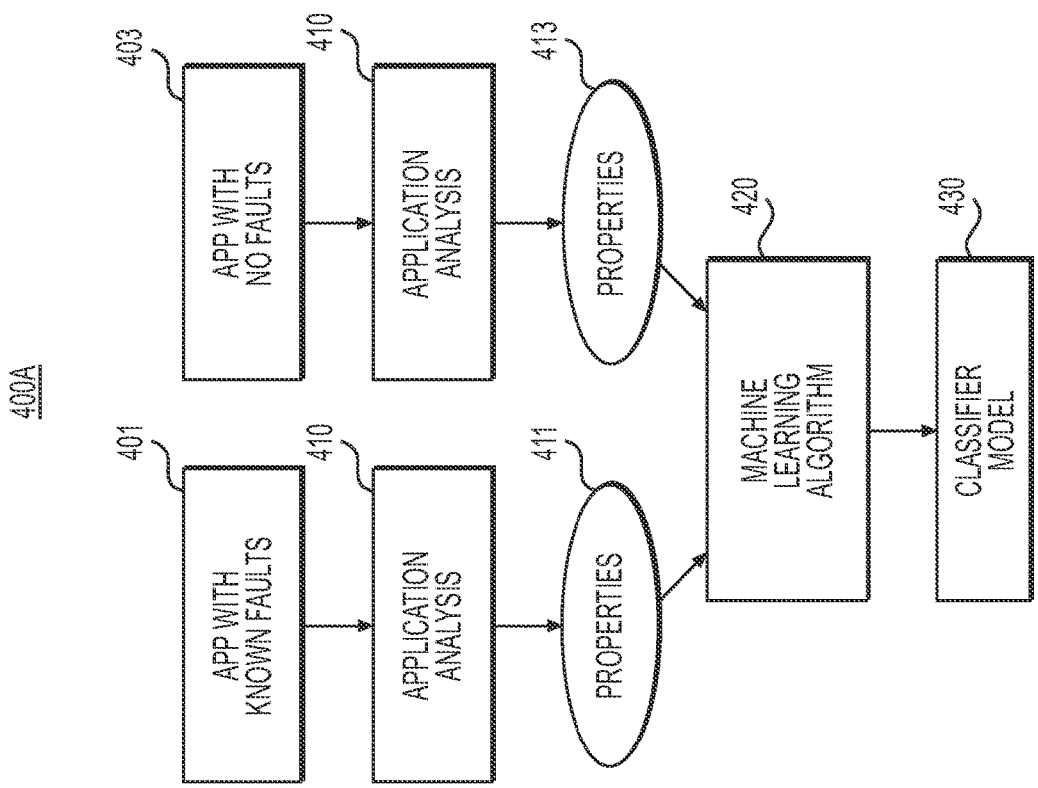
FIG. 4B
FIG. 4A

SYSTEMS AND METHODS FOR ESTABLISHING AND MANAGING COMPUTER NETWORK ACCESS PRIVILEGES

RELATED APPLICATIONS

This application is a continuation of U.S. patent application 16/839,728, filed Apr. 3, 2020, entitled "Permission Request System and Method," now U.S. Pat. No 11,354,386, issued Jun. 7,2022, which is a continuation of U.S. patent application 15/701,128 filed Sep. 11, 2017, now U.S. Pat. No. 10,628,500, issued Apr. 21, 2020, entitled "Permission Request System and Method." The disclosures of these patent documents are hereby incorporated by reference.

BACKGROUND

Advanced persistent threat (APT) attacks generally involve a computer network attack in which an unauthorized person gains access to the network and implants a file or program (e.g., malware) that remains undetected for a sustained period. APT attacks may be intended to steal data rather than to damage the network. APT attacks may target organizations in sectors with high-value information, such as national defense, manufacturing, and the financial industry. An APT attack may occur in multiple phases to break into a network, avoid detection, and extract valuable and sensitive information over time. The many APT variations make it difficult to protect computers and computer networks from APT attacks. While APT attacks are stealthy and hard to detect, certain aspects of an APT attack. For example, deep log analyses and log correlation from various sources may be useful in detecting APT attacks, and agents may be used to collect log data directly from computers operating on the network.

In addition to protecting against APTs, computer users may be concerned about the amount of access a computer application may have to specific computer resources and devices. This access may be referred to as privilege. Privilege also refers to how much a user or an application may modify a computer system. In some computer systems, both users and applications may be assigned more privileges than the users or applications should have, and malware can take advantage of these over-privilege conditions.

Some computer systems do not distinguish between an administrator or root and non-administrator users of the computer system, and allow all users of the computer system to modify the computer system's internal structures. Such computer systems are vulnerable to malware through the computer system's privilege structure. Some computer systems allow code executed by a user to access all rights of that user. In these computer systems, malware, running as over-privileged code, can use this privilege to subvert the computer system. Many computer operating systems use scripting applications to control access to computer resources; when the scripting applications execute, the computer system allows applications all privilege rights of that user. Thus, these computer systems also are vulnerable to malware through the computer system's privilege structure. In a specific example, use of over-privileged code makes computer systems vulnerable to malware in the form of e-mail attachments, which may or may not be disguised.

SUMMARY

A method for managing privilege access in a computer system by applications executing on the computer system includes receiving a system call request from an application, the system call request requesting access to resources of the computer system; determining by a processor a status of the system call request; and for a non-permanently-allowed system call request, including generating, by the processor, a volatile access control list for the non-permanently-allowed system call request, providing a user with a system call request prompt comprising a plurality of actions, receiving, by the processor, an action selection from the user, performing a privilege operation for the system call request based on the received action, and storing the privilege operation for the system call request in a privilege profile for the application.

A processor-implemented permission request method for controlling resources, comprising, in a computer system, a processor generating and maintaining a privilege profile for an application executing on the computer system, the privilege profile comprising actions taken for previous resource access requests from the application; receiving a resource access request from the application; determining a status of previous resource access requests corresponding to the received resource access request; allowing the resource access request when the status is permanently allowed; providing a prompt to a user when the status is other than permanently allowed, comprising providing a visual display with two or more actions selectable by the user; receiving an action selection from the user; and executing the action selection.

A system for managing privilege access by applications in a computer system comprising a non-transitory, computer-readable storage medium storing a program of instructions that when executed, cause a processor to receive a system call request from an application, the system call request requesting access to resources of the computer system; determine a status of the system call request; and fora non-permanently-allowed system call request; generate a volatile access control list for the non-permanently-allowed system call request, provide a user with a system call request prompt comprising a plurality of actions, receive an action selection from the user, perform a privilege operation for the system call request based on the received action, and store the privilege operation for the system call request in a privilege profile for the application.

A method for detecting, identifying, and mitigating advanced persistent threats in a computer network having one or more computers includes a processor in the computer network: receiving a request to access a resource in the computer network; identifying the request as originating from an application executing on the computer network; executing an anomaly operation to determine a behavior of the application is one of anomalous and not anomalous; executing a privilege operation to determine the request is one of permanently allowed and not-permanently allowed; granting access to the resource for both a non-anomalous-behaving application and a permanently allowed request; and generating and displaying, on a graphical user interface of the computer network, and prompt for either an anomalous-behaving application or a not-permanently allowed request.

DESCRIPTION OF THE DRAWINGS

The detailed description refers to the following figures in which like numerals refer to like objects, and in which:

FIGS. 4A-4C illustrates additional aspects of the permission request system of FIG. 3.

DETAILED DESCRIPTION

Figure 1:
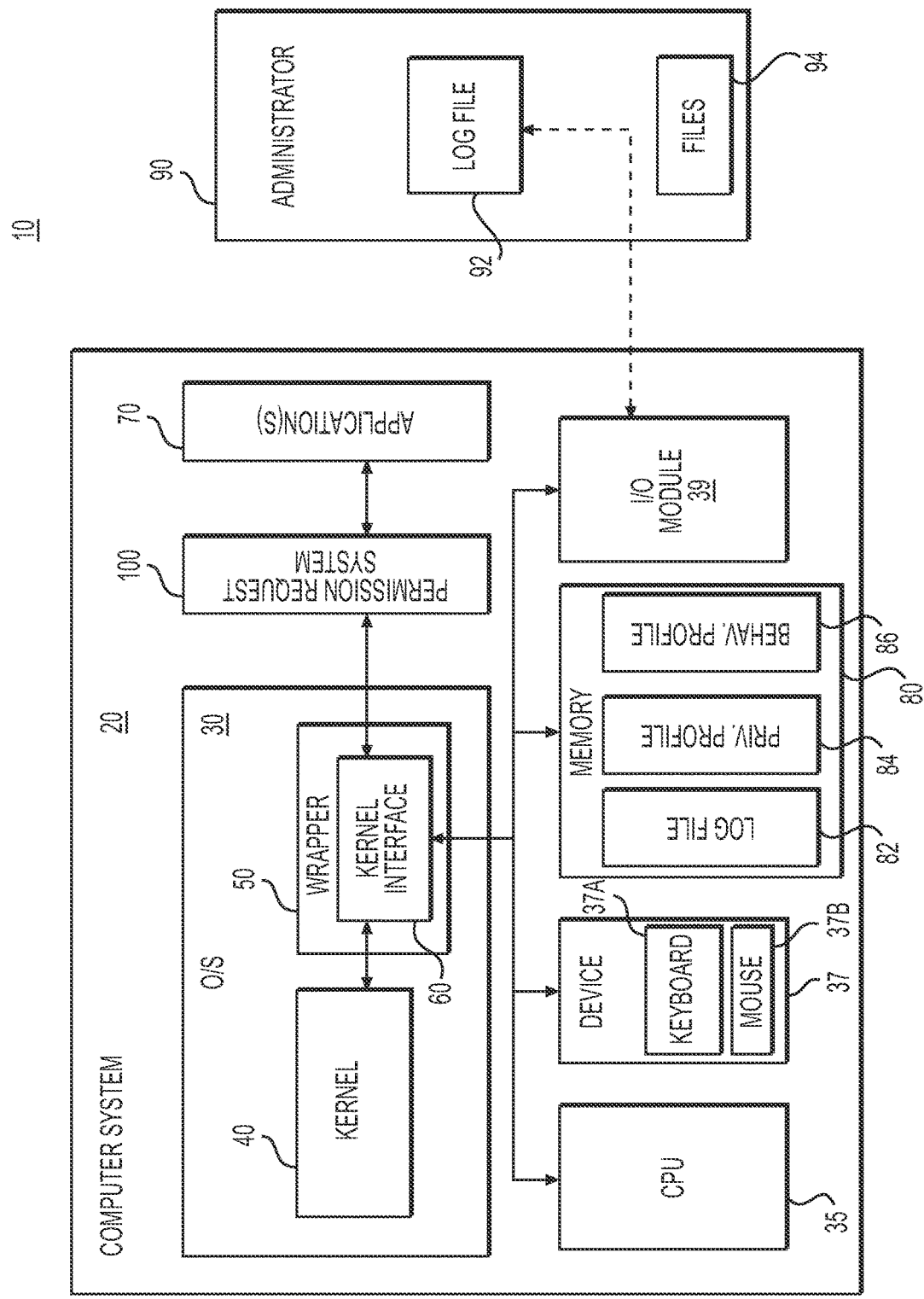
FIG. 1 illustrates a computer network in which a permission request system may be implemented.

Advanced persistent threats (APTs) comprise malware that is implanted in or injected into a vulnerable computer or computer network, often with the intent of accessing sensitive information. APTs are capable of remaining undetected by metering traffic and masking communications within common protocols of the infected/infiltrated computer or computer network. Time until discovery of an APT attack may be high-past breaches have proven that infiltration can last years, allowing APT attacks to exfiltrate gigabytes of sensitive information. Current APT detection and mitigation systems often are slow to, or fail to, adapt to the rapid innovation of APTs and are unable to reliably detect APT attacks. Analysis shows that 99% of malware hashes are seen only during a one-minute time-span, making signature-based detection of the malware unreliable. Zero-day attacks (i.e., unannounced attacks) also evade detection before indicators of compromise can be identified. Additionally, network-based anomaly detection systems lack the context needed to differentiate standard Web traffic from data exfiltration from an APT attack. Situational awareness is needed to more accurately detect abnormalities such as understanding normal computer program/application execution to discern deviations and more accurately identify malicious activity at its source. Enterprises and non-government organizations suffer financially from APT attacks. For government entities, APT attacks may have consequences that cannot be measured in financial amounts alone. An innovative methodology is needed to move beyond current, ineffective cyber defense approaches to detecting and mitigating APT attacks.

To overcome limitations with existing APT detection and mitigation systems, as well as to enhance privacy protections in a non-threat environment, disclosed herein is a permission request system, and corresponding method of use, that enables granular control and monitoring of the behavior of computer applications. In describing the structure of the permission request system, and its method of use, the disclosure will refer to the following terms and their definitions:

An application is a defined set of machine instructions written to perform certain functions. As used herein, an application and a program are equivalent. An example application is a word processor. The application executes by making system calls to a component of the computer on which the application is installed.

A computer network is an accumulation of individual computer systems. The computer network may be formed to serve a specific enterprise or organization. A computer system is, or includes a computer. A computer system also includes peripherals such as a keyboard, for example. Computer systems in the computer network may use a local area network or a wide area network (e.g., the Internet) to communication among each other. The computer systems in the computer network may be under control of an administrator computer system, or simply administrator.

Privilege refers to the extent to which a user or an application may modify a computer system, or to what extent the user or application may access resources of the computer system.

A system call (described in more detail below) may be thought of simply as a request to access specific aspects of a computer system—both hardware and software components—to enable the application to perform specific operations.

A user is a human operator of a computer system or computer network. A user may be an individual or an administrative user.

The permission request system implements the following functions and features:

Interception of application-initiated system call requests;
An agnostic access control list (ACL) implementation;
On-demand system call request resolution function;
A filter or profile system that cooperates with agnostic ACLs;
An anomalous behavior detection system; and
A user interface that in part implements the on-demand system call request resolution function.

The permission request system may implement additional functions and features.

A system call is the programmatic way in which a computer application executing on a computer requests a service from a kernel of the computer's operating system. The system call may include a request to access hardware-related services (for example, accessing a hard disk drive), to access files, create and execute new processes, and communicate with integral kernel services such as process scheduling. System calls provide an essential interface between the application and the operating system. In some computer systems, system calls can be made only from user-space processes (i.e., executing applications-user space is the memory area where application software and some drivers execute; by way of contrast, kernel space is a memory area reserved for running a privileged operating system kernel, kernel extensions, and most device drivers), while in some computer systems, privileged system code also issues system calls. The architecture of many modern processors includes a security model. An example security model specifies multiple privilege levels under which an application may be executed: an application may be limited to its own address space so the application cannot access or modify other running applications or the operating system itself, or directly manipulate hardware devices (e.g., the frame buffer or network devices). However, many applications may need access to these components, so system calls are made available by the operating system to provide well defined, safe implementations of applications. The operating system executes at the highest level of privilege, and allows applications to request services via system calls, which often are initiated through interrupts. (An interrupt automatically puts the computer system's central processing unit (CPU) into an elevated privilege level, and then passes control to the kernel (i.e., kernel mode), which determines whether the calling application should be granted the requested service.) If the system call is granted, the kernel executes a specific set of instructions over which the calling application has no direct control, returns the privilege level to that of the calling application, and then returns control to the calling application. Generally, a computer's operating system(s) (OS) provides a library or API that sits between normal applications and the operating system. On Unix® systems (the use of the name "Unix®" herein will be understood to apply to Unix®-like operating systems such as)Solaris®), the API is usually part of an implementation of the C library (libc), such as glibc, that provides wrapper functions for the system calls, often named the same as the system calls they invoke. (A wrapper is simply a communications layer between the library or other interface and the calling application. The wrapper specification describes how different elements of data and metadata coexist in a computer file.) With Windows® systems, the API is part of a Native API in the ntdll.dll library; this is an undocumented API used by implementations of the regular Windows® API and directly used by some applications. The library's wrapper functions expose an ordinary function for using the system call, as well as making the system call more modular. In the Windows® operating system, the primary function of the wrapper is to place all the arguments to be passed to the system call in the appropriate processor registers, and set a unique system call number for the operating system kernel to system call. In this way the library, which exists between the OS and the application, increases portability. The call to the library function itself does not cause a switch to kernel mode (if the execution was not already in kernel mode) and is usually a normal subroutine call (using, for example, a call assembly instruction in an instruction set architecture (ISA)). The actual system call does transfer control to the kernel (and is more implementation-dependent and platform-dependent than the library call abstracting it). For example, in Unix® systems, fork and execve are C library functions that in turn execute instructions that invoke fork and exec system calls. Making the system call directly in the application code is more complicated and may require embedded assembly code to be used as well as knowledge of the low-level binary interface for the system call operation, which may be subject to change over time and thus not be part of the application binary interface; the library functions are meant to abstract this away—which explains why most operating systems are designed to handle system calls in the manner described above; however, the same structure exposes the hosting computer system to APT attacks as described herein. On other kernel-based systems, system calls may be implemented through a library of assembly language macros. These other kernel systems also are vulnerable to APT attacks through system calls.

On Unix® operating systems, frequently-used system calls include open, read, write, close, wait, exec, fork, and exit. Many operating systems have hundreds of system calls. For example, Linux® has over 300 different calls, and Windows® 10 has close to 700. Tracing utilities such as strace in Linux® and truss in Unix® (both are a debugging utilities that monitor system calls requested by an application) allow an application to execute from start and report all system calls the process invokes, or can attach to an already running application and intercept any system call made by the application. This tracing capability also may be implemented with a system call, e.g. strace is implemented with ptrace ("process trace"—a Unix® system call) or system calls on files in procfs, a special filesystem in Unix®-like operating systems that presents information about processes and other system information in a hierarchical file-like structure, providing a more convenient and standardized method for dynamically accessing process data held in the kernel than traditional tracing methods.

In sum, system calls are low level mechanisms for calling functions in an operating system kernel for accessing file, network, process, device, and time operations. Malware may directly or indirectly use system calls to maliciously manipulate a computer system. Malware also may exploit an installed program or application to perform operations that may cause abnormal computer system or application behavior. Finally, malware may target computer peripherals such as keyboard devices that have local firmware by installing key loggers to gain persistence on the computer system.

The herein disclosed permission request system operates on a computer system between the computer system's applications and the computer system's operating system kernel. In an embodiment, the permission request system is an on-demand system in the sense that whether certain operations requested from the kernel by the computer system's applications are allowed or denied is determined in real time as a part of the resource access request process. Furthermore, the request process is agnostic in that the request process is consistent among all applications. These on-demand and agnostic features begin with an access control list (ACL) structure that includes two distinct ACL formats, namely: persistent and volatile. Persistent ACLs may be invoked to all instances of an application, and may apply to kernel operations that are permanently allowed for the application. Volatile ACLs are unique to each application instance and any permissions granted through a volatile ACL are discarded when the application closes. Volatile ACLs are on-demand in the sense that a computer system (human) user may edit (e.g., allow/deny) a requested kernel operation as part of a request from an application to access a kernel operation (or another computer resource). The user interaction may be enabled by a prompt or display provided to the user through the computer's operating system. In an embodiment, the permission request system intercepts system calls from an application and monitors for new and abnormal system calls. In an aspect, the permission request system creates and maintains a profile or filter for each application installed on the computer system, and its "permanently-allowed" system calls. The profile also may maintain, for each application, systems calls that are allowed or denied on an "as-occurring" or "ad hoc" basis; i.e., a user allows or denies access when the system call request is made. The permission request system notifies users of certain changes to application behavior (e.g., a new system call) and prompts users to allow or deny the application access to the operations related to the (new) system call. The permission request system also notifies users when an ad hoc system call is made from the application. Non-ad hoc system calls, once allowed, may be considered permanently-allowed system calls. All application-generated requests for resource access (e.g., kernel operations) are handled in a consistent manner-this agnostic nature of the permission request system removes or limits incompatibility issues between and among computer system components.

The permission request system executes to prevent exploitation of trusted applications by, for example, preventing malware from gaining the privileges the malware needs to operate. In an aspect, the permission request system intercepts application operations, requests, or system calls, which then are filtered against user-allowed operations, requests, or system calls. If a requested system call matches a previously allowed system call, the permission system allows or denies the system call based on the user's past answer. If a requested system call is a newly-requested system call, or an ad hoc system call, the permission request system may prompt the computer's user to allow or deny the newly-requested or ad hock system call. In an aspect, a user may modify the profile, changing a previously-allowed system call to a denied or to an ad hoc system call. Thus, applications operate normally until a system call is made that does not match a permanently-allowed system call, at which point, the system call request may be denied, and the application halts, or the user may be prompted to allow the system call if the user deems the operation to be non-malicious. The profile may be modified according to the given response, making it simple for the user and having configuration occur organically as the needs of an application changes. This approach follows the principle of least privilege, removing an APT's ability to leverage a vulnerable application to inject malware and gain a foothold.

The permission request system may use specific access control list (ACL) formats: persistent and volatile. Persistent ACLs exist over multiple program instances as well as between program restarts. Volatile ACLs, however, only exist for the single instances, which they are allowed through a user prompt and choose not to enable the permission indefinitely.

The permission request system may use enhanced system call processes. For example, a system call may have been made by an application such as a word processor program requesting to open a file. The system call process invoked by the permission request system may use defined actions that are assigned to rules; the actions and rules together define a task to accomplish when the rule and action to which it is paired match an existing allowed system call. Two common actions are ALLOW and DENY, which either allow the system call to pass to the operating system kernel, or reject the request; however, additional capabilities are possible.

In parallel with execution of its permission management functions, the permission request system provides an anomaly detection function using, for example, a heuristic analysis module. The detection function may begin when an application is installed on a computer, at which point the system initiates a training period to construct a profile that includes common behaviors of the application. After the initial training period, if the application acts in a manner that a heuristic analysis executed by the heuristic module shows to be inconsistent with normal behavior, the user will be alerted to the anomaly and given the opportunity to stop the application. In an enterprise environment, these anomalous events may be logged to notify system administrators, who then may decide if further action is needed. This heuristic analysis may detect zero-day attacks of trusted applications and prevent exploitation by adversaries.

The permission request system is configurable for different operating modes to adapt to the needs of both home and enterprise environments. For a home user, system calls may be grouped into various categories to simplify permission management. For example, opening, closing, creating and deleting files can be combined under a single file permission that allows access only to common directories. This aspect of the permission request system limits opportunities for an application to access computer resources not normally (or ever) required during its execution, thereby limiting opportunities for malware to infiltrate the computer operating system. This aspect of the permission request system also prevents confusion and reduces the amount of interaction with the user, reducing the likelihood that the user will become desensitized to notifications.

The permission request system enables control that was not previously possible, providing greater security and privacy for enterprises and individual users. By restricting application capabilities, zero-day attacks are unable to infiltrate a computer system if those attacks need access to resources that have not been allowed by the user. In this way, the permission request system provides organizations, enterprises, and individual users with real-time protection from advanced persistent threats.

FIG. 1 illustrates an example computer system embodying aspects of the herein disclosed permission request system; the computer system may be one of many such computer systems of an enterprise computer network. Alternately, the computer system may be a standalone computer system under control of an individual user. In FIG. 1, computer system 20 is shown as a component (e.g., one of many computer systems) of enterprise computer network 10, which also includes administrator 90. Administrator 90 may be a separate computer system or server, or component of a separate computer system or server. Administrator 90 may control certain aspects of computer network 10 and computer system 20, such as which applications are allowed on computer system 20, what security constraints are required, and which system updates to implement. Administrator 90 includes log file 92, in which the administrator 90 stores information provided by computer system 20 related to access privileges granted to applications executing on the computer system 20. The administrator 90 also includes file store 94, in which the administrator 90 stores additional information related to application(s) 70, including currently approved versions of the application(s) 70.

The computer system 20 includes operating system 30 (O/S 30), central processing unit 35 (CPU 35) devices 37, input/output module 39 (I/O module 39), and memory 80. The computer system 20 also may include one or more applications 70. Finally, the computer system 20 includes permission request system 100, shown between O/S 30 and application 70. The devices 37 may include, for example, keyboard 37A and pointing device 37B (e.g., a mouse). Operating system 30 may be a commercially-available operating system, such as a Windows® operating system, a Unix® operating system, or a Linux® operating system, for example. Such operating systems may include an operating system kernel. Operating system 30 includes kernel 40 and kernel interface 60. The kernel interface 60 may be a digital link library (DLL). The memory 80 may include DLL log file 82 and privilege profile 84. Memory 80 may comprise one or more of static memory, such as a hard drive, flash memory, and/or electrically erasable programmable read-only memory (EEPROM), and dynamic memory, such as random access memory (RAM), dynamic random access memory (DRAM), and/or a cache. Input/output module 39 may include hardware, software, or both to enable computer system 20 to upload files to and download files from administrator 90 and to communicate with a user of the computer system 20.

The kernel interface 60 is shown as encased by software wrapper 50. In some embodiments, wrapper 50 encases more than one kernel interface 60 and may encase all kernel interfaces (not shown) to which an application 70 may make system calls. Kernel 40 represents one or more core modules of O/S 30 responsible for memory, process execution, and I/O interface management. Kernel interface 60 is a system-level software module that provides an API that applications, such as application 70, may call to interface with kernel 40 and thereby access computer system resources known to and controlled by O/S 30. Wrapper 50 includes a layer of software to capture system calls to kernel 40 by way of kernel interface 60.

As one example, O/S 30 may be a Windows® operating system, kernel 40 may be the Windows® operating system kernel, and kernel interface 60 may be a Windows® digital link library, such as ntdll.dll. Application 70 may comprise one of many types of software. This configuration is described below as one example to illustrate aspects of the permission request system 100. As another example, O/S 30 may be a UNIX® operating system, kernel 40 may be the UNIX® operating system kernel, and kernel interface 60 may be a system call interface. Thus, the permission request system is not limited to use of DLLs, system call interfaces, or any other particular type of kernel interface, but may include other operating system kernel reference structures or simply the kernel itself.

Memory 80 represents data memory or possibly persistent storage used to store log file 82, privilege profile 84, and behavior profile 86. Wrapper 50 generates log file 82 and, in one embodiment, writes the log in accordance with the extensible markup language (XML). Log file 82 represents a privilege log, and includes information describing each system call to kernel interface 60 by application 70. Thus, log file 82 comprises an application-specific and device-specific log of system calls to kernel interface 60. In an embodiment, log file 82 may include entries for each instance of privilege by application 70.

Privilege profile 84 contains a history of access to resources of computer system 20 by applications 70 (that is, the privileges (e.g., ALLOW) accorded application 70 in response to system calls). While only shown to contain a single log file 82 and a single privilege profile 84, multiple DLLs may be wrapped, and memory 80 may store multiple application privilege profiles similar to privilege profile 84. Each additional application privilege profile (not shown) corresponds to a different application. As one example, computer device 20 may execute and profile multiple applications similar to application 70, and wrapper 50 may generate distinct log files 82 for each application 70 that accesses kernel interface 60.

In an enterprise network, such as computer network 10, where computer system 20 is a client device, administrator 90 may configure computer system 20 to enable computer system 20 to log calls to kernel interface 60. Specifically, the administrator 90 may install and configure wrapper 50 and I/O module 39, such that wrapper 50 generates log file 82, and I/O module 39 uploads the content of log file 82 to administrator 90. The administrator 90 maintains the uploaded content of log file 82 in log file 92. Once the file wrapper 50 is configured, users, such as user 101 of FIG. 2, may log into computer systems 20 by, for example, entering a username and password at a sign-in screen provided by O/S 30. Once user 101 has logged in, O/S 30 may assign user-specific privileges to user 101, thereby controlling access by user 101 to certain resources in computer system 20 and computer network 10. Through interactions with computer system 20, user 101 may direct O/S 30 to launch and execute application 70.

In executing application 70, O/S 30 may grant certain system-level privileges to application 70 that may be utilized by application 70. For example, application 70 may comprise a word processor program, and O/S 30 may allocate file manipulation privileges, such as file open, file read, file write, and file delete privileges, to application 70. User 101 may interact with application 70 to open a file, thereby requiring application 70 to invoke a file open function defined within kernel interface 60. The file open function may require that application 70 exercise a file open privilege, and wrapper 50 logs the corresponding system call(s) to log file 82. Wrapper 50 may log one or more of the functions being invoked and its arguments, including the contents of any file handles or other nested structures, a return status, i.e., whether the system call succeeded, values of any passed-by-reference structures after the system call completes, any access tokens, an application counter of the calling application, and the application counter of the last system call from application 70 to kernel interface 60.

During execution of application 70, wrapper 50 may continue to log all system calls to kernel interface 60 or may log only those system calls that require privilege to log file 82. Upon user 101 terminating execution of application 70, wrapper 50 may close log file 82 and stop logging system calls to kernel interface 60. In the case of an enterprise computer network 10, upon either the closing of log file 82 or according to some pre-defined upload schedule configured by the administrator 90, I/O module 39 may upload all or a portion of log file 82 to administrator 90. In an embodiment, I/O module 39 may first compare privilege profile 84, if it exists, to log file 82 to determine if application 70 invoked any new system-level privileges or privileges previously characterized as not yet categorized within privilege profile 84. In instances where new or not yet categorized privileges are invoked, I/O module 39 may upload only these new or not yet categorized privileges to administrator 90. In another embodiment, I/O module 39 may make no comparison to privilege profile 84 and instead may load the log file 82 to administrator 90. In either embodiment, I/O module 39 may upload a portion of, or the entire log file 82 to the administrator 90.

Figure 2:
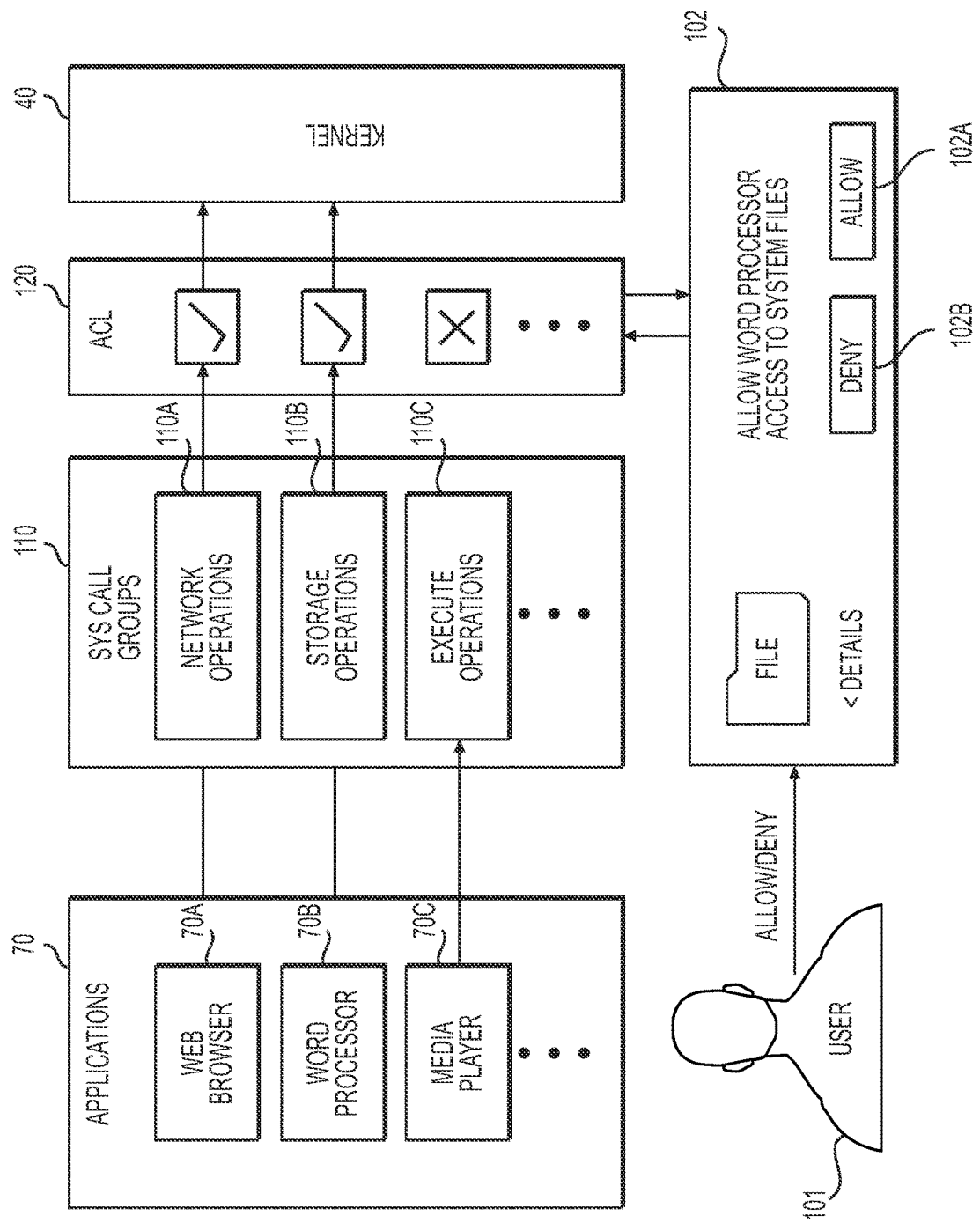
FIG. 2 illustrates operational aspects of a permission request system.

FIG. 2 illustrates operational aspects of example permission request system 100. In FIG. 2, computer system 20 includes applications 70A-70C which communicate indirectly with operating system kernel 40 through system call module 110 and access control list 120, both of which are components of permission request system 100. Also shown is user interface display 102, which is provided through execution of components of the system 100 to provide visual information and prompts to (human) user 101. As can be seen, application 70A is an Internet application (e.g., a browser) that allows the computer system 20 to access the Internet; application 70B is a word processing application; and application 70C is a media player. Application 70A uses network operation call group 110A; application 70B uses storage operation call group 110B; and application 70C uses execute operation call group 110C. Thus, for example, for Internet access, the application 70A places a system call as network operations call group 110A. As can be seen figuratively, the access control list 120 functions to allow the applications 70A and 70B access to kernel 40 while denying kernel access to application 70C.

Figure 3:
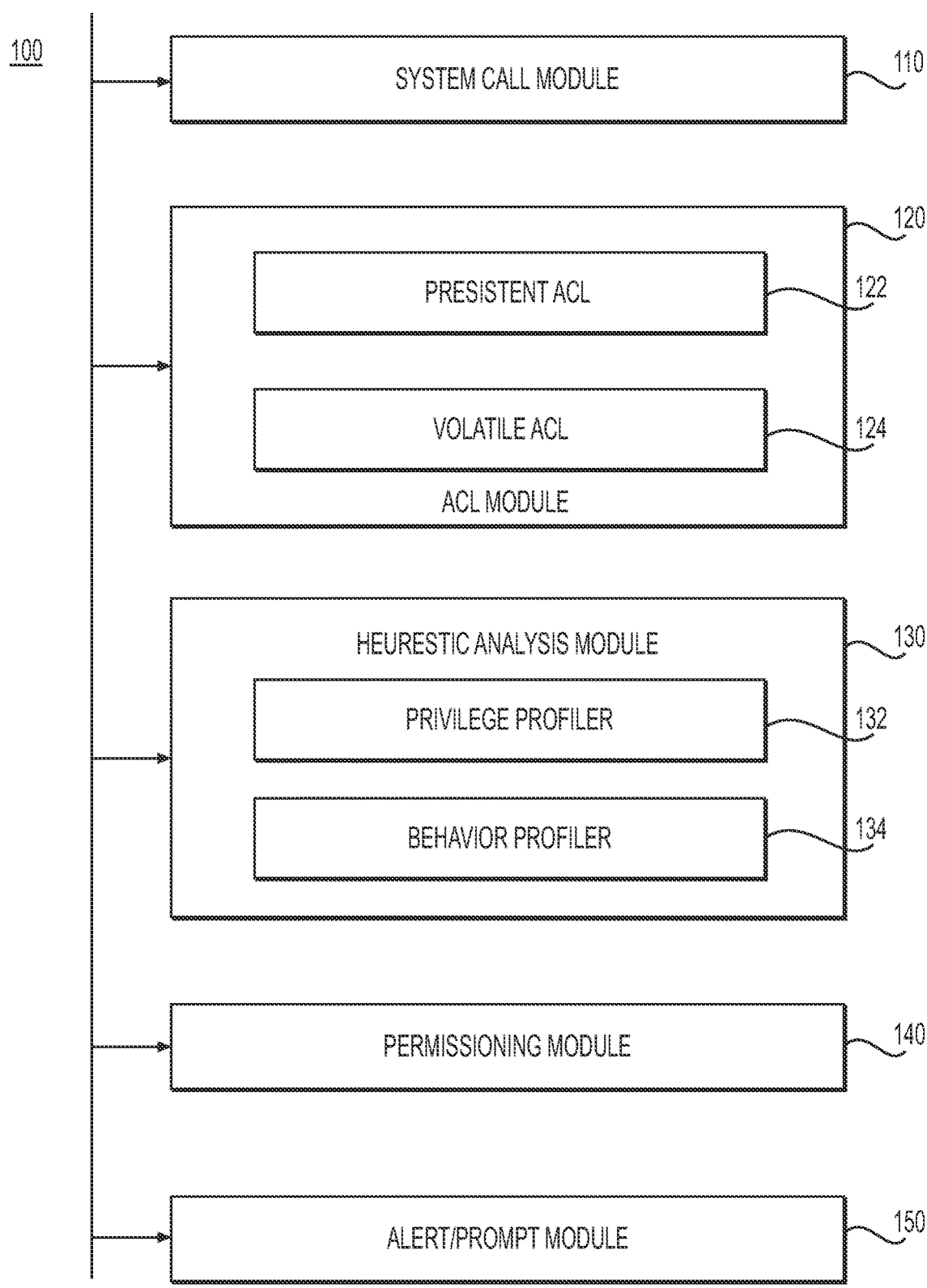
FIG. 3 illustrates an example permission request system.

FIG. 3 illustrates example permission request system 100. In FIG. 3, permission request system 100, (seen in FIG. 1 as implemented between applications 70 and kernel 40), includes system call module 110, ACL module 120, heuristic analysis module 130, permissioning module 140, and alert/prompt module 150.

System call module 110 may use various methods to intercept system calls from an application to an operating system kernel. Malware may directly or indirectly use system calls to manipulate the computer system. Often, APTs access system calls directly, rather than through a library, because accessing library functions by malware can be challenging and is often protected against (e.g., via address space layout randomization and data execution prevention). (Address space layout randomization (ASLR) is intended to prevent exploitation of memory corruption vulnerabilities. To prevent an attacker from reliably jumping to, for example, a particular exploited function in memory, ASLR randomly arranges (offsets) the address space positions of key data areas of a process, including the base of the executable and the positions of the stack, heap, and libraries. Data execution prevention (DEP) prevents certain memory sectors, e.g. the stack, from being executed. When the two techniques are combined, it becomes exceedingly difficult to exploit vulnerabilities in applications using shellcode or return-oriented programming (ROP) techniques. In a non-ASLR and non-DEP process, the stack address is the same every time a process runs, creating an exploitable vulnerability.) Malware also may exploit an installed application to perform operations that may cause abnormal behavior. By intercepting system calls, the system 100 enables granular control of individual application access to the kernel 40. In an embodiment, the system call module 110 forces an application 70 to load a DLL that contains replacement functions, which would be called in place of direct system calls, which the permission request system 100 then may manage. This DLL attachment function may be accomplished by running all applications through an application launcher so that the DLLs may be injected into the application. (An application launcher helps locate and start other applications. The application launcher may provide shortcuts to an application, and may store the shortcuts in one place—such as a computer desktop-so the applications are easier for a user to find and start.) In another embodiment, the system 100 may employ a bootstrap explorer that enables all applications started through the operating system 30; however, use of the bootstrap explorer may open opportunities for malware to bypass the ACL filtering. In another embodiment, the system 100 may use a library that contains utilities to attach arbitrary DLLs to the applications.

System call module 110 also generates system call groups. For example, the module 110 may aggregate multiple, allowed system calls to form a system call group. In an aspect, the module 110 aggregates individual, permanently allowed system calls. In another aspect, the module 110 aggregates system calls that would be common and appropriate for a specific application.

ACL module 120 applies an access control list (ACL) approach to system calls to enable granular control over computer resources that are accessible to applications. The ACL module 120 may generate and update (modify) ACLs. The ACL module may generate ACLs in different formats, including a persistent ACL 122 and a volatile ACL 124. Persistent ACLs 122 exist over multiple application instances as well as between application restarts. The volatile ACL 124 may support an on-demand function of the permission request system 100. A volatile ACL 124 exists only for the single instance in which the ACL 124 is allowed. As noted herein, this ad hoc treatment is enabled through a user prompt (display 102, FIG. 2), which user 101 may access and may employ to allow or deny a system call permanently or on a one-time basis. The ACL approach is agnostic and applies equally and in the same manner to all applications 70. This ACL-style control for system calls gives system administrators and individual users greater control over the security of their computer system(s). This ACL-style control also allows users 101 to implement enhanced privacy measures.

The ACL module 120 may generate a persistent ACL through cooperation with other modules of the permission request system 100. For example, heuristics analysis module 130 tracks permissions granted by user 101 through display 102. Such tracking also may occur by the ACL module 120 accessing log file 82 or privilege profile 84, or in real time as system call requests are allowed (or denied) through display 102. Persistent ACLs may be updated when the privilege profile 84 changes (for example, by user 101 editing the privilege profile).

The heuristics module 130 performs a number of functions. The heuristics module 130 includes privilege profiler 132 that, among other functions, generates privilege profile 84 for each user-application pair (e.g., for user 101 and application 70B). In an aspect, the privilege profiler 132 may access the log file 82 to extract actions (ALLOW or DENY) corresponding to system calls.

In parallel with execution of the privilege management functions of profiler 132, behavior profiler 134 develops a behavior model of, and behavior profile 86 (see FIG. 1) for each application 70. The behavior model and behavior profile 86 may be used to detect anomalous behavior by the application 70. Such anomalous behavior may indicate the presence of malware from an APT attack. The behavior profiler 134 may execute in two phases. In a first, training phase, the profiler 134 develops a model that, when applied to an actual application instance, may indicate anomalous behavior. In an aspect, the first phase may include a machine learning period. Following the machine learning period, the profiler 134 may use the trained model to classify an application instance as misbehaving. As an alternative to model construction, training, and classification, the profiler 134 may compare specific properties of the application instance to the application's behavior profile 86 to detect any property changes that may indicate the presence of malware.

In an embodiment of behavior profiler 134, when an application is installed in the computer system 20, behavior profile 86 is constructed to provide a mechanism for detecting anomalous behavior of the application. In an enterprise environment, these anomalous events may be logged to notify system administrators, who then may decide if further action is needed. This heuristic analysis may detect zero-day attacks of trusted applications and prevent exploitation by adversaries.

In an embodiment, the anomalous behavior detection function of the behavior profiler 134 may begin when an application 70 is installed on computer system 20, at which point behavior profiler 134 initiates a training period to construct a model and behavior profile 86. In one aspect, the model and behavior profile 86 include common behaviors of the application 70. In an aspect, the model is constructed using observed or detected differences between an application instance with no known faults (i.e., a known, properly-behaving application instance) and a misbehaving application instance. After the initial training period, if the application acts in a manner that a heuristic analysis executed by application of the model shows to be inconsistent with normal behavior, the user 101 may be alerted to the anomaly and given the opportunity to stop the application.

Figure 4C:
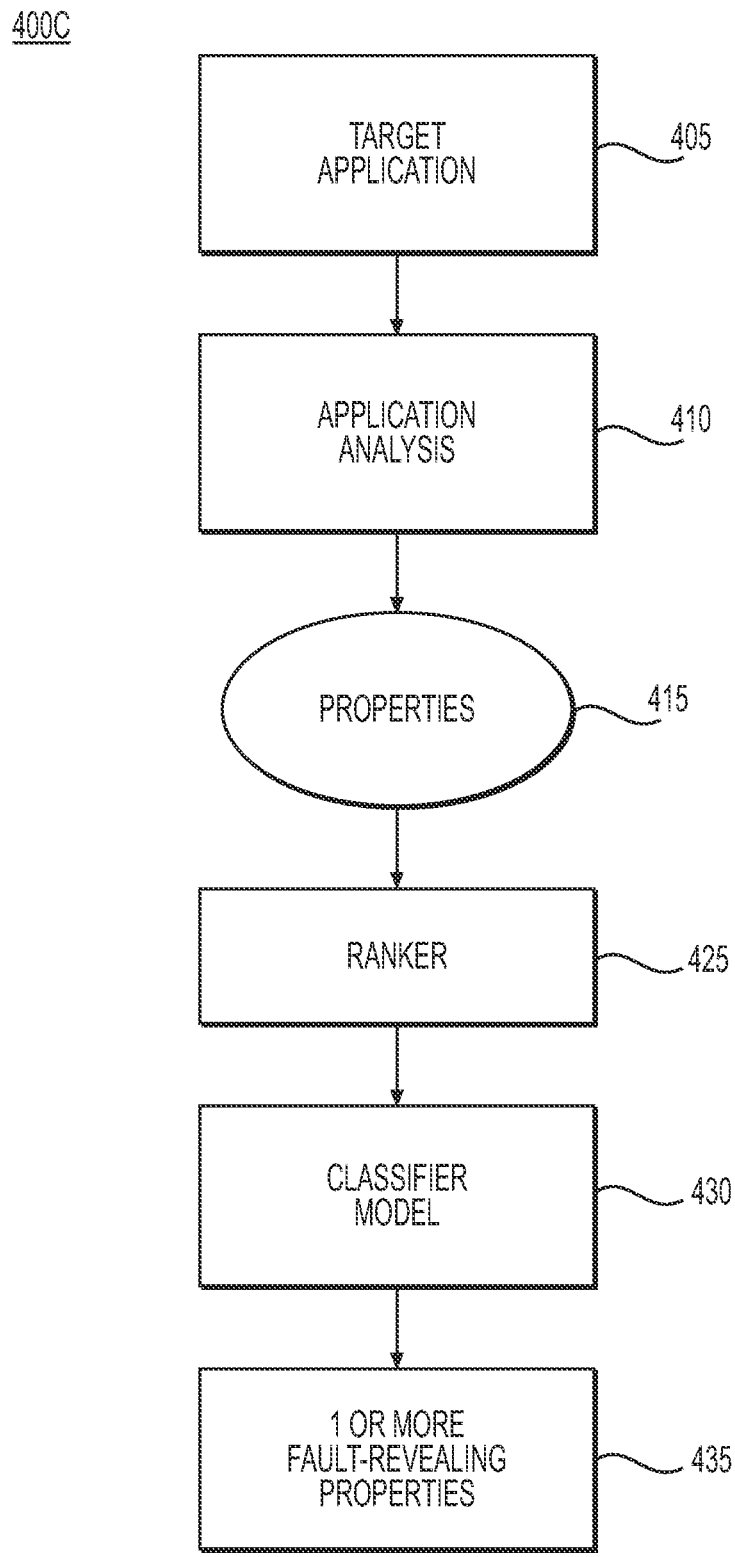

Referring to FIGS. 3 and 4A, in an aspect, the profiler 134 uses an error correlation technique to generate a fault classifier model 430 based on error-correlated properties. In a first, training phase, the model 430 is generated automatically from a set of application instances with known errors (a priori) and corrected application instances. The profiler 134 generates properties 411 of applications 401 with faults, and properties 413 of applications 403 with those faults removed. A dynamic property detector performs application analysis 410 to generate the runtime properties. The detector's outputs are likely application properties, each a mathematical description of observed relationships among the properties. Together, these properties form an operational abstraction that is syntactically identical to a formal specification, including preconditions, postconditions, and objects. The detector reports a property only if there is adequate statistical evidence for the property. For example, if there are an inadequate number of observations, observed correlations may be mere coincidence. Consequently, for each detected property, the detector computes the probability that such property would appear by chance in a random set of samples. The property is reported only if its probability is smaller than a user-defined confidence parameter. A machine learning algorithm 420 then is applied to produce the model 430. Before being inputted to the machine learning algorithm 420, each property 411, 413 is converted to a characteristic vector and is labeled as fault-revealing or non-fault-revealing. Properties 411, 413 that are present in only faulty applications are labeled as fault-revealing; properties that appear in both faulty and non-fault applications are labeled as non-fault-revealing; and properties that appear only in non-faulty applications are not used during the training phase. See FIG. 4B. An example machine learning algorithm is the support vector machine learning algorithm. FIG. 4C shows how the classifier model runs on an application. First, through blocks 405 and 410, the target application instance is selected any analyzed to produce, block 415, properties of the target application instance. Next, in ranker block 425, each property is ranked by its likelihood of being fault-revealing. Since machine learners are not guaranteed to produce perfect models, this ranking is not guaranteed to be perfect, but examining the properties labeled as fault-revealing is more likely to lead to an error than examining randomly selected properties. The ranked properties are then subjected, block 430, to a classifier model. Only one fault-revealing property is needed to detect an error, and the classifier model is used to examine the properties according to their rank, until an error is discovered. In block 435, the fault-revealing properties are listed.

The permissioning module 140 establishes and uses specific objects to allow the permission request system 100 to execute its intended functions. The representations of the objects may be defined using XML Schema Definition (XSD) to define the abstract representation of object characteristics and their relationships to other objects in a parsable format the system 100 can understand. The objects may be of three distinct object types: rules, actions, and groups. These objects types and associated object instances provide a basis that users 101 and administrators 90 may employ to secure their computer systems and networks. Rule object types define the specific attributes a system call must contain to trigger a match between an existing allowed system call (or system call group) and a system call being requested by an application 70. For example, a system call may have been made by a word processor application 70B requesting to open a file. Parameters of a system call also may be assigned specific criteria; for example, a user 101 may want only application 70B to access files located in a "My Documents" path. A corresponding rule object instance may require source (e.g., application); operation (e.g., file access); and parameter (if any) (e.g., file path). A rule object of the rule object type therefore gives users and administrators the granular control needed to act only upon desired information. Action objects are assigned to rules and define a task to accomplish when the rule the action is paired with is matched. Two common actions are ALLOW and DENY; in this example, the action object either allows the system call to pass or denies the request; additional action objects are possible. System administrators may wish to log certain actions if they believe them to be suspicious. More reactive approaches also may be implemented such as implementing a firewall rule to block a potential adversary. Group objects (compare to system call groups, described above) are a combination of rule object types and (in some aspects) action object types that may be created and assigned to multiple applications to simplify the configuration process. File access is an operation that many applications require, and creating a group type to give default file access permission may reduce the number of user notifications the system 100 may make. An example of a file permission group object instance would be to allow applications access to create, delete, open, and close system calls only when the parameters are within the application's install directory (for example "My Documents"), and temporary directories. Certain group object instances may be tied to, and implemented through, persistent ACLs. Other group object instances may be implemented through volatile ACLs. Any other resources, beyond those accessible through the group object instances, that are needed by the application may be requested by a separate system call, which may be implemented through a volatile ACL, and which the user may allow or deny. This on-demand schema (i.e., using volatile ACLs) gives users 101 and administrators 90 the ability to allow applications access only to the resources the user wishes to provide. The XML file format makes it easy for users 101 and administrators 90 to manage permissions through a text editor and graphical configuration tools, or the on-demand schema through user prompts that will guide the configuration process.

The alert/prompt module 150 provides various alerts and prompts for user 101, including the prompt of display 102. Alerts may take the form of notifications to user 101 or administrator 90 that an application is experiencing abnormal behavior. Prompts may provide users with an option to allow or deny a system call request. Returning to FIG. 2, display 102, which is generated by permission request system 100 in response to certain systems call requests from application 70, prompts user 101 to specify an action; by selecting button 102A, user 101 selects action ALLOW, and by selecting button 102B, user 101 selects action DENY. Thus, the display 102 shows a user prompt generated by alert/prompt module 150 in response of a system call requested processed through a volatile ACL. In an embodiment, system calls or group system calls processed through a persistent ACL may not result in generation of a user prompt such as that shown in display 102 of FIG. 2. Other actions, and corresponding buttons, are possible. Selecting action ALLOW permits a system call to be transmitted to kernel 40. The system 100 may present a prompt on display 102 whenever an application 70: (1) requests a new system call (i.e., a system call not previously requested), (2) requests a previously allowed system call that the user 101 has not designated as permanently allowed, or (3) requests a previously denied system call. In an embodiment, the system 100 may include a PERMANENT button (not shown) that may be displayed to the user 101, and which the user 101 may select after the user 101 selects the action ALLOW. In an aspect, a similar process may be used to permanently deny certain system calls. Note however, that the system 100 may preserve an editable file of system call allowances and denials, and the user 101 may edit the file to reinstate permanently denied system calls, or to make other, similar changes. In an aspect, the permanent option may apply only to ALLOW actions. In an embodiment, the system 100 provides some system calls for some applications as permanently allowed based on, for example, profile processing. In another embodiment, in which the computer system 20 is a device in enterprise computer network 10, administrator 90 (FIG. 1) may set some system calls for some applications 70 as permanently allowed or permanently denied. In another embodiment, the certain system calls may be aggregated to form system call groups—for example, groups of system calls that are routinely requested by a specific application 70. In the case of word processor application 70B, the system call group could include access, read, write, and delete system calls—system calls that when requested by the word processor application 70B, would not indicate anomalous behavior. The system call groups may be defined by administrator 90, or by an individual user 101. The system 100 may provide a system call group wizard to assist user 101 form system call groups. The system 100 may provide suggestions for aggregating system calls based on prior actions selected by the user 101 as recorded in privilege profile 84.

Figure 5A:
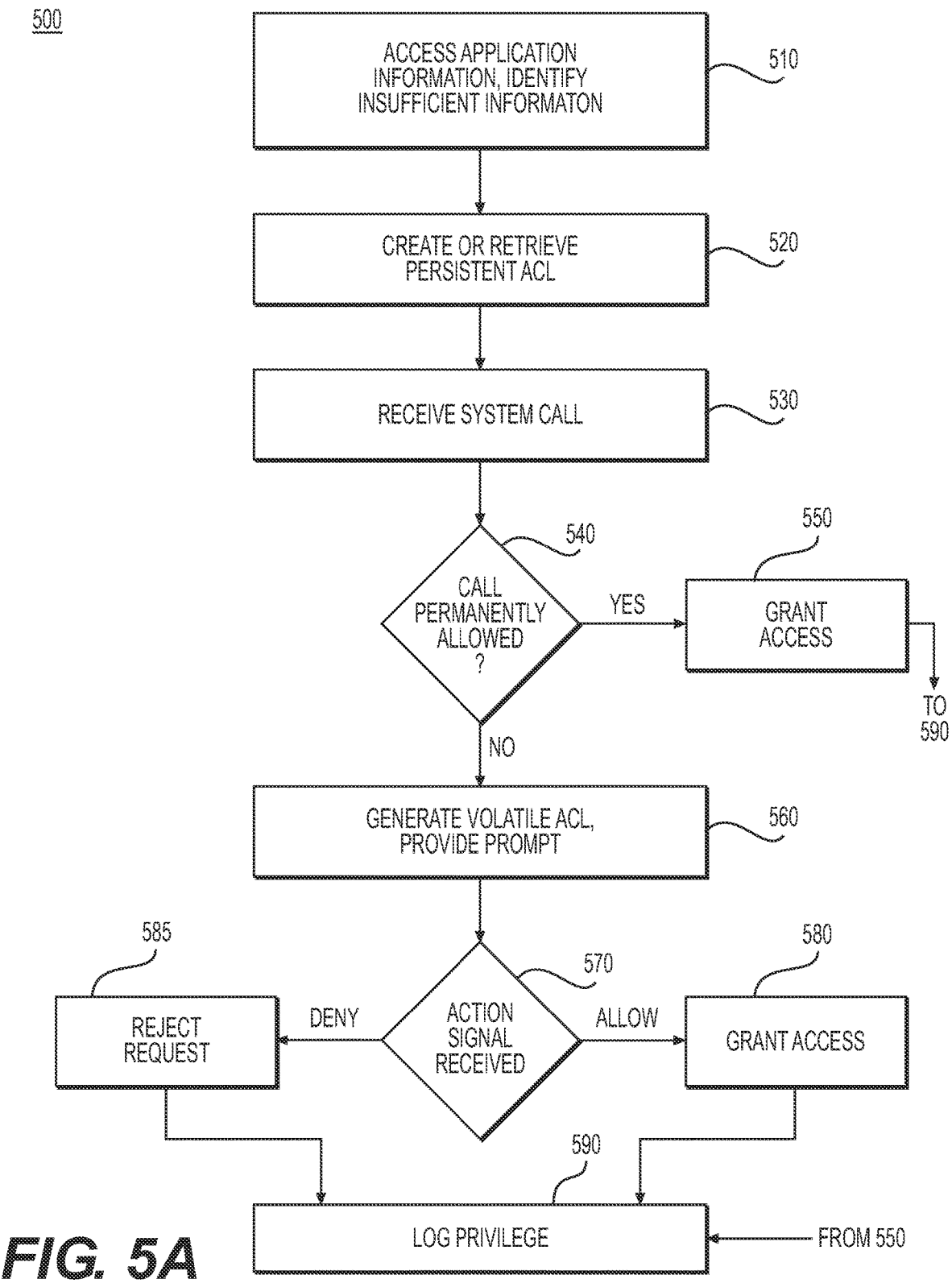
FIGS. 5A-6 illustrate example operations of the permission request system of FIG. 3.
Figure 5B:
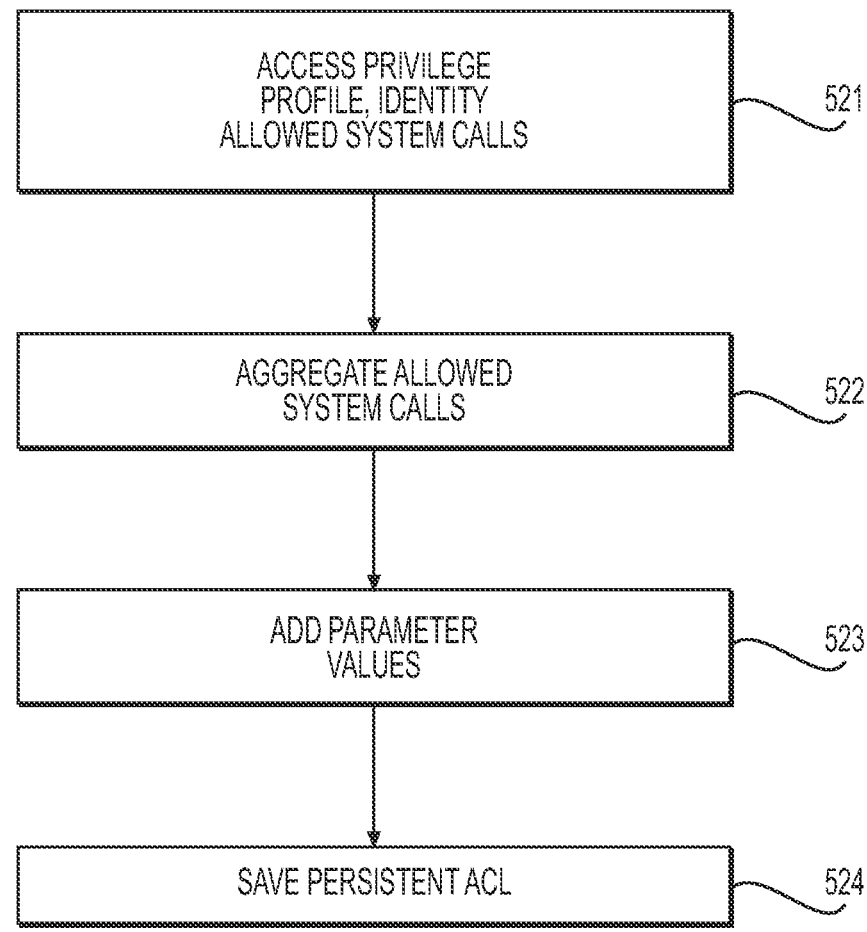
Figure 5C:
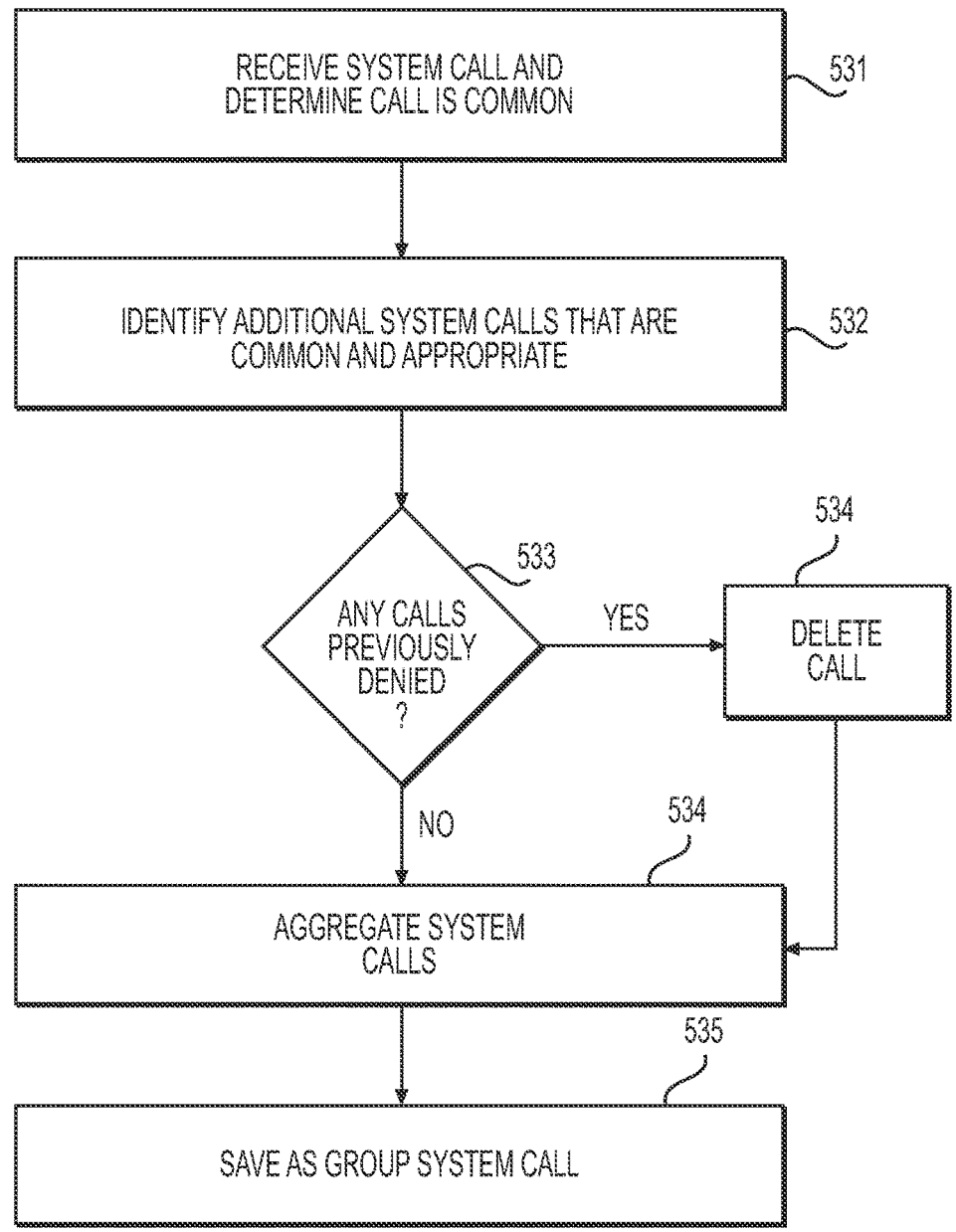

FIGS. 5A-5C illustrate example operations of the permission request system 100. In FIG. 5A, operation 500 begins in block 510 when the system 100 accesses information related to applications 70 instantiated on computer system 20. The information includes information contained in a privilege profile 84 and a behavior profile 86. In an aspect of block 510, the system 100 identifies applications 70 for which profiles do not exist, and the system 100 monitors application instantiations to determine when sufficient information is available to generate the privilege and behavior profiles. The operation 500 then moves to block 520.

In block 520, the system 100 creates one or more persistent access control lists (ACLs) for each application 70 and stores the ACLs in memory 80. The operation 500 then moves to block 530.

In block 530, the system 101 receives a system call request from application 70. In block 540, the system 100 determines if the system call request relates to a permanently-allowed system call request in a persistent ACL. In block 540, if the system call request exists as a permanently-allowed system call request, the operation 500 moves to block 550 and the system 100 grants access by the application 70 to the operating system kernel 40. In block 540, if the system call request does not exist as a permanently-allowed system call request, the operation 500 moves to block 560.

In block 560, the system 100 generates a volatile ACL and provides a visual prompt to user 101 to allow or deny the application 70 access to the operating system kernel 40 by way of the system call request. In block 570, the system 100 receives an action signal from the user 101. In block 570, if the action is ALLOW, the operation 500 moves to block 580, and the system 100 grants application 70 access to the operating system kernel 40. In block 570, if the action is DENY, the operation 500 moves to block 585 and the system 100 rejects the system call request from the application 70. Following either block 580 or block 585, the operation 500 moves to block 590 and the system 100 logs the actions in the data log 82 and optionally edits the privilege profile 84. The operation 500 then ends.

FIG. 5B illustrates aspects of block 520, specifically generation of a persistent ACL. In FIG. 5B, operation 520a begins in block 521 with the system 100 accessing privilege profile 84 to identify system calls that are allowed for a specific application. Note that allowed system calls in the privilege profile 84 may be designated as temporary or permanent. In block 522, the ACL module 120 aggregates system calls that are allowed and permanent to generate the persistent ACL. Note that operation 520a may apply to a group system call as well as to individual system calls. In block 523, the system adds any parameter values associated with the allowed, permanent system calls. Parameters may include, for example, a path, or similar parameter, and the parameter's value is the path name. In block 524, the ACL module 120 saves the persistent ACL in memory 80. Operation 520a then ends.

FIG. 5C illustrates aspects of the operation of block 530, specifically aggregation of individual system calls to generate a group system call. In FIG. 5C, operation 530a begins in block 531 when the system 100 receives a system call request from application 70 and determines the system call request is a common call request appropriate for application 70. In block 532, the system 100 determines if additional system call requests would be common and appropriate for application 70. For example, if the first system call request is a read system call request, and application 70 is a word processor, the read system call request would be common and appropriate. The operating system 30 includes additional system call requests such as write and delete that would be common and appropriate for the word processor. In block 533, the system 100 determines if any of the identified common system calls was denied previously. If any system calls were denied previously, the operation 530a moves to block 534 and the denied system calls are deleted from operation 530a. Following block 533 (No) and block 534, operation 530a moves to block 535 and the system 100 aggregates the individual common, non-denied system calls into a group system call. Following block 535, operation 530a ends.

Figure 6:
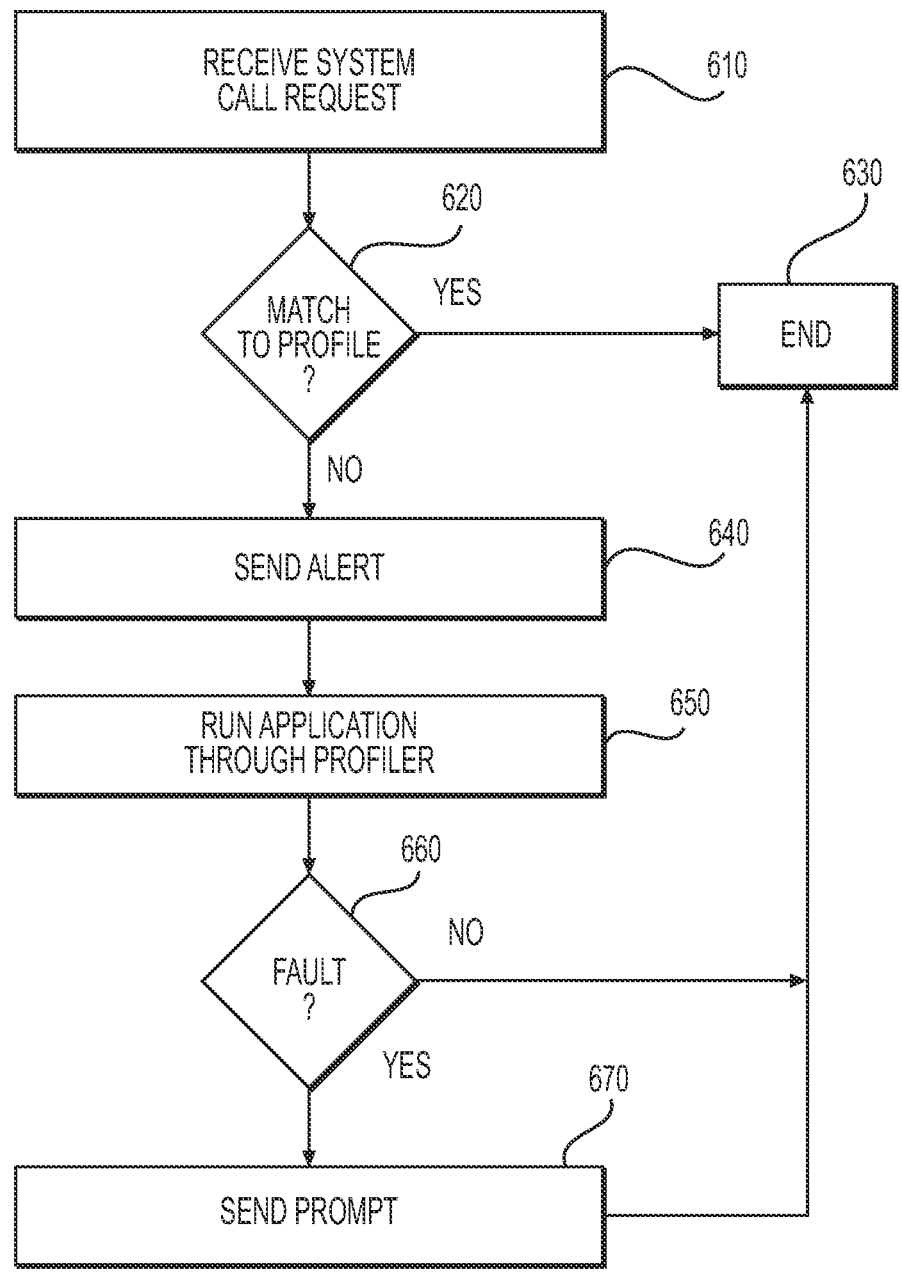

FIG. 6 illustrates example operation 600 in which system 100 executes to detect and mitigate a potential APT attack. In block 610, the heuristics analysis module 130 receives a system call request from application 70. In block 620, the module 130 compares the received system call request to behavior profile 86 for application 70 and determines if the system call request matches the behavior pattern. In an example, the request may not match if the request had never previously been recorded in the log file 82, and thus represents a new request. In block 620, if a match exists, the operation 600 moves to block 630 and ends. However, if in block 620, a match does not exist, the operation 600 moves to block 640 and the module 130 signals the alert/prompt module 150 to issue a user alert. Following block 640, operation 600 moves to block 650 and the module 130 applies the behavior profiler 134 to the application 70. The operation 600 then moves to block 660, and the behavior profiler 134 provides either a no fault signal or signal of one or more fault-revealing properties. If a no fault signal is produced, the operation moves to block 630 and ends. If a signal of one or more fault-revealing properties is received, the operation 600 moves to block 670, and the module 130 sends a signal to the alert module 150 to issue a user prompt to stop execution of application 70. The operation 600 then moves to block 630 and ends.

Certain of the devices shown in FIGS. 1-3 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 4C and 5A-6. The disclosed devices, components, and systems contemplate using or implementing any suitable technique for performing the steps illustrated. Thus, FIGS. 4C and 5A-6 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A non-transitory, computer-readable storage medium having encoded thereon, machine instructions for establishing and managing computer network access privileges, wherein a processor executes the machine instructions to:
   access information related to applications instantiated on a computer system, wherein the information comprises information contained in a privilege profile and in a behavior profile;
   identify applications for which neither privilege profiles nor behavior profiles exist;
   monitor application instantiations to determine that sufficient information is available to generate a privilege profile and a behavior profile for the application;
   create one or more persistent access control lists (ACLs) for the application, and store the persistent ACLs;
   receive a system call request from an application;
   determine, from a persistent ACL, that the received system call request exists as one of a permanently-allowed system call request and a non-permanently-allowed system call request;
   for permanently-allowed system call requests:
      determine the system call request pertains to one of a behavior contained in the behavior profile for the application and one of a new behavior for the application,
      for a behavior contained in the behavior profile for the application, grant access by the application to an operating system kernel of the computer system, and
      for a new behavior, provide a first prompt to a human user to allow or deny the application access to the operating system kernel by way of the system call request; and
   for a non-permanently-allowed system call request:
      generate a volatile ACL,
      provide a second prompt to a human user to allow or deny the application access to the operating system kernel by way of the non-permanently allowed system call request,
      add the non-permanently-allowed system call request to the volatile ACL, and
      following execution of the application, delete the volatile ACL.

2. The non-transitory, computer-readable storage medium of claim 1, wherein the processor receives an ALLOW action signal from the human user in response to one of the first and the second prompt, and the processor grants the application access to the operating system kernel.

3. The non-transitory, computer-readable storage medium of claim 1, wherein processor receives a DENY action signal from the human user from one of the first and the second prompt, and the processor rejects the system call request from the application.

4. The non-transitory, computer-readable storage medium of claim 3, wherein the processor logs the actions in a data log.

5. The non-transitory, computer-readable storage medium of claim 1, wherein generation of a persistent ACL comprises the processor accessing privilege profiles to identify system calls that are allowed for a specific application, wherein system calls in the privilege profile are designated as one of temporary and permanent.

6. The non-transitory, computer-readable storage medium of claim 5, wherein the processor edits the privilege profile.

7. The non-transitory, computer-readable storage medium of claim 1, wherein the processor aggregates system calls that are allowed and permanent to generate the persistent ACL.

8. The non-transitory, computer-readable storage medium of claim 7, wherein the processor aggregates group system calls and individual system calls.

9. The non-transitory, computer-readable storage medium of claim 7, wherein the processor adds parameter values associated with the allowed, permanent system calls.

10. The non-transitory, computer-readable storage medium of claim 9, wherein the parameters include a path, and a value of parameter is a path name.

11. The non-transitory, computer-readable storage medium of claim 7, wherein aggregation of individual system calls generates a group system call, wherein the processor:
determines the system call request is a common call request appropriate for the application;
determines that additional system call requests would be common and appropriate for the application;
determines that an identified common system call was denied previously; and
aggregates individual common, non-denied system calls into a group system call.

12. The non-transitory, computer-readable storage medium of claim 11, wherein a first system call request is a read system call request, and the application is a word processor, wherein the processor determines a read system call request would be common and appropriate.

13. The non-transitory, computer-readable storage medium of claim 11, wherein the processor deletes any denied system calls.

14. A computer-implemented method for establishing and managing computer network access privileges, comprising:
a processor accessing information related to applications instantiated on a computer system, wherein the information comprises information contained in a privilege profile and in a behavior profile;
identifying applications for which neither privilege profiles nor behavior profiles exist;
monitoring application instantiations to determine that sufficient information is available to generate a privilege profile and a behavior profile for the application;
creating one or more persistent access control lists (ACLs) for the application, and storing the persistent ACLs in memory;
intercepting a system call request from an application;
determining the system call request exists as one of a permanently-allowed system call request and a non-permanently-allowed system call request;
for permanently-allowed system call requests:
determining the system call request pertains to one of a behavior contained in the behavior profile for the application and one of a new behavior for the application,
for a behavior contained in the behavior profile for the application, granting access by the application to an operating system kernel of the computer system, and
for a new behavior, providing a first prompt to a human user to allow or deny the application access to the operating system kernel by way of the system call request; and
for a non-permanently-allowed system call request:
generating a volatile ACL,
providing a second prompt to a human user to allow or deny the application access to the operating system kernel by way of the system call request, and
adding the non-permanently-allowed system call request to the volatile ACL.

15. The method of claim 14, wherein the processor:
receives an ALLOW action signal from the human user;
grants the application access to the operating system kernel; and
for a non-permanently-allowed system call request, creates a corresponding privilege profile for the application with the non-permanently-allowed system call request recorded as permanently allowed.

16. The method of claim 14, wherein processor receives a DENY action signal from the human user, and the processor rejects the system call request from the application.

17. The method of claim 14, wherein generating a persistent ACL comprises the processor accessing privilege profiles to identify system calls that are allowed for a specific application, wherein system calls in the privilege profile are designated as one of temporary and permanent.

18. The method of claim 17, wherein the processor:
aggregates system calls that are allowed and permanent to generate the persistent ACL;
aggregates group system calls and individual system calls; and
adds parameter values associated with the allowed, permanent system calls.

19. The method of claim 14, comprising:
the processor intercepting application-initiated system call requests from an application executing on the computer network and stopping resource access by the intercepted system call requests;
performing an anomaly operation to detect anomalous behavior in an intercepted system call request, comprising:
examining behavior of the application,
identifying an existing error condition, and
generating an error signal for any existing error condition; and
causing display of the error signal on a graphical user interface in communication with the processor.

20. The method of claim 19, wherein the processor:
compares an intercepted system call request to objects stored in the ACL, the objects comprising:
action objects, and
group objects; and
determines a match exists for one of an action object and a group object.

* * * * *